United States Patent
Liu et al.

(10) Patent No.: US 8,657,194 B2
(45) Date of Patent: Feb. 25, 2014

(54) COMPACT HYBRID IMAGING LENS ASSEMBLY IN AN IMAGING READER

(75) Inventors: Rong Liu, Centereach, NY (US); David Tsi-Shi, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 3 days.

(21) Appl. No.: 13/175,245

(22) Filed: Jul. 1, 2011

(65) Prior Publication Data

US 2013/0001308 A1    Jan. 3, 2013

(51) Int. Cl.
*G06K 7/10* (2006.01)

(52) U.S. Cl.
USPC .............. 235/454; 235/462.11; 235/462.24; 235/462.35; 235/462.41; 235/462.43

(58) Field of Classification Search
USPC .............. 235/454, 462.11, 462.24, 462.35, 235/462.41, 462.43
See application file for complete search history.

(56) References Cited

U.S. PATENT DOCUMENTS

| | | | |
|---|---|---|---|
| 2004/0056096 A1* | 3/2004 | Gurevich et al. | 235/454 |
| 2009/0141000 A1* | 6/2009 | Krishnan et al. | 345/175 |

* cited by examiner

*Primary Examiner* — Kristy A Haupt
(74) *Attorney, Agent, or Firm* — Nong-Qiang Fan

(57) ABSTRACT

A compact hybrid imaging lens assembly captures return light from a target over a field of view of a linear array of image sensors of a solid-state imager, and projects the captured return light onto the array during electro-optical reading of the target. The assembly includes a plastic lens for optical aberration correction, a glass lens spaced away from the plastic lens along an optical axis, and an aperture stop between the lenses and having an asymmetrical aperture through which the optical axis extends. The glass lens has substantially all the optical power of the imaging lens assembly for thermal stability, and the plastic lens has substantially no optical power. A holder holds the lenses and the aperture stop away from the array. Alignment elements on the plastic lens align the asymmetrical aperture relative to the linear array.

15 Claims, 4 Drawing Sheets

COMPACT HYBRID IMAGING LENS ASSEMBLY IN AN IMAGING READER

DESCRIPTION OF THE RELATED ART

Solid-state imaging systems or imaging readers have been used, in both handheld and hands-free modes of operation, to electro-optically read symbol targets, such as one-dimensional symbols, particularly Universal Product Code (UPC) symbols, two-dimensional symbols, particularly Portable Data File 417 (PDF417) symbols, and non-symbol targets, such as driver's licenses, receipts, signatures, etc., the targets being associated with products to be identified and processed in supermarkets, warehouse clubs, department stores, retailers, libraries, factories, parcel deliveries, etc. In the hands-free mode, the products were typically slid or moved by a user across, or presented to, a presentation area, e.g., a reader window that faces the target. In the hand-held mode, the reader was held by the user, and the reader window was manually aimed at the target.

The imaging reader included a solid-state imager with a sensor array of photocells or light sensors (also known as pixels), which correspond to image elements or pixels over a field of view of the imager, and an imaging lens assembly for capturing return light scattered and/or reflected from a target being imaged, and for projecting the return light onto the sensor array to initiate capture of an image of the target as pixel data. The imager was configured as a one- or two-dimensional charge coupled device (CCD) or a complementary metal oxide semiconductor (CMOS) device, and included associated circuits for producing and processing electrical signals corresponding to a one- or two-dimensional array of the pixel data over the field of view. The imager was controlled by a controller or programmed microprocessor that was operative for processing the electrical signals into data indicative of the target being imaged and, when the target was a symbol, for processing and decoding the symbol.

The known imaging lens assembly typically comprised a plurality of lenses of different sizes and optical powers. The lenses were held in a lens holder and arranged along an optical axis. Traditionally, each lens was made of glass for improved thermal stability, because glass has a relatively lower coefficient of thermal expansion and a relatively lower refractive index variation over temperature, as compared to plastic. Hence, an all-glass lens design was typically used to minimize focal shift over an operating temperature range. Yet, the all-glass lens design was heavier and more expensive to fabricate by machining than an all-plastic lens design. A plastic lens is lighter than a corresponding glass lens and can be easily fabricated by molding. Nevertheless, despite the lighter weight and lower fabrication cost of the plastic lens, the thermal instability and focal shift were unacceptable in many electro-optical reading applications.

The known imaging lens assembly typically also comprised an aperture stop having a symmetrical aperture, e.g., a circular aperture, on the optical axis. In some applications, e.g., when using a one-dimensional linear sensor array, an asymmetrical aperture, e.g., a rectangular or elliptical aperture, was desired for an improved signal-to-noise ratio and more reliable and responsive reader performance. In that event, the asymmetrical aperture needed to be aligned with the linear sensor array, and the all-glass lens assembly provided very little design flexibility in implementing alignment between a glass lens and the linear sensor array. Typically, such alignment had to be implemented not on the glass lens, but instead, on the lens holder, in which case, the aperture stop was integrally molded of one-piece construction with the holder. However, the one-piece molded aperture stop was a relatively thick element, and the edge of the aperture was not sharply defined. As a result, the optical performance characteristics of the aperture stop were not fully realized.

Accordingly, it would be desirable to provide a compact, lightweight and inexpensive, imaging lens assembly of high thermal stability, especially useful in portable and mobile applications where size, weight and cost are at a premium. It would be further desirable to facilitate alignment between an imaging lens assembly having an asymmetrical aperture and a linear sensor array without sacrificing optical performance.

SUMMARY OF THE INVENTION

The present invention relates to a reader for, and a method of, electro-optically reading targets, especially one- or two-dimensional symbols, by image capture. The reader could be embodied as a stationary or portable point-of-transaction workstation having a window, or as a handheld reader having a window. In some applications, the window can be omitted, in which event, the reader has a windowless opening at which the target is located for reading. As used herein, the term "presentation area" is intended to cover both a window and a windowless opening. In the case of the workstation, the target is swiped past, or presented to, the presentation area and, in the case of the handheld reader, the reader itself is moved and the presentation area is aimed at the target. In the preferred embodiment, the workstation is installed in a retail establishment, such as a supermarket.

A solid-state imager is mounted in the reader, and includes an array of image sensors having a field of view during the reading. Preferably, the array is a one-dimensional, charge coupled device (CCD) or a complementary metal oxide semiconductor (CMOS) device. When the reader is operated in low light or dark environments, an illuminator is also mounted in the reader and illuminates the target during the reading with illumination light directed from an illumination light source through the presentation area. The illumination light source is preferably at least one light emitting diode (LED), and preferably a plurality of LEDs.

In accordance with one aspect of this invention, a compact hybrid imaging lens assembly is provided in the reader, and is operative for capturing return illumination light through the presentation area from the target over the field of view, and for projecting the captured return illumination light onto the array during electro-optical reading of the target. The hybrid assembly includes a plastic lens for optical aberration correction. Preferably, the plastic lens has opposite surfaces of substantially the same curvature and has substantially none of the optical power of the imaging lens assembly. The hybrid assembly also includes a glass lens spaced away from the plastic lens along an optical axis. The glass lens has substantially all of the optical power of the imaging lens assembly for thermal stability. Preferably, the glass lens has opposite surfaces of different curvature.

The hybrid assembly further includes an aperture stop, as a discrete component, between the lenses. The aperture stop has an asymmetrical aperture, e.g., a rectangular or elliptical aperture, through which the optical axis extends. A holder holds the lenses and the aperture stop in spaced relation relative to the array. Alignment elements remote from the holder align the asymmetrical aperture relative to the array. Preferably, the alignment elements are integral with the plastic lens by being molded therewith. Thus, the alignment elements may include a first pair of molded projections that are received in a pair of cutouts formed in the aperture stop to align the aperture stop with the plastic lens, and/or may include a second pair of molded extensions for engagement with a turning tool to align the plastic lens with the linear array. The cutouts could equally well be formed in the plastic lens, in which case, the projections or extensions would be formed on the aperture stop or the turning tool, respectively.

Thus, the hybrid assembly is part-glass and part-plastic. Since virtually all the optical power is configured in the glass lens, and virtually no optical power is configured in the plastic lens, the hybrid assembly has better thermal stability and better resistance to focal shift with temperature variation as compared to an all-plastic lens assembly. The use of plastic lowers the size, weight and cost of the overall assembly and also lowers the number of optical components that comprise the assembly.

The use of plastic further enables alignment elements to be molded into the plastic lens. This could not be done with a glass lens. As noted above, these alignment elements enable the aperture stop to be aligned with the plastic lens, and also enable the plastic lens, as well as the entire assembly, to be aligned with the linear array. Thus, an asymmetrical aperture can be readily incorporated into the assembly. The aperture stop need no longer be molded into the holder, but instead, can be made as a quite thin separate component, and with a sharply defined edged aperture, to thereby realize improved optical performance.

In the hybrid assembly of this invention, the aperture is placed between the glass lens and the plastic lens, and provides optimum compensation of odd order aberrations (coma, astigmatism, distortion, etc.) since they tend to cancel each other. As a result, image distortion of less than 0.5% can be easily achieved. Image magnification stays nearly unchanged on and off the optical axis. Another benefit is that the physical size or diameter of the lenses can be minimized, thereby further reducing the overall weight and volume of the lens assembly.

Another aspect of the present invention resides in a method of capturing return light from a target over a field of view of an array of image sensors of a solid-state imager, and of projecting the captured return light onto the array during electro-optical reading of the target. The method is performed by correcting optical aberration with a plastic lens, spacing a glass lens with substantial optical power for thermal stability away from the plastic lens along an optical axis, positioning an aperture stop having an asymmetrical aperture through which the optical axis extends between the lenses, holding the lenses and the aperture stop in a holder in a spaced relation relative to the array, and aligning the asymmetrical aperture relative to the array with alignment elements remote from the holder, and preferably integral with the plastic lens.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
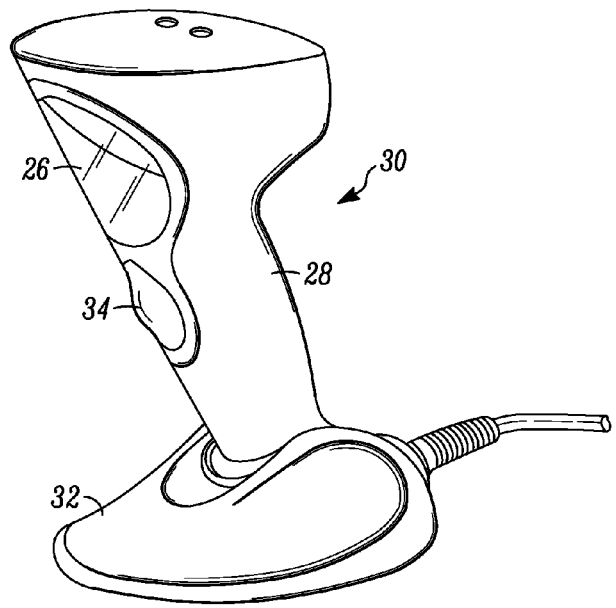
FIG. 1 is a perspective view of a portable imaging reader operative in either a handheld mode, or a hands-free mode, for capturing return light from targets.

Reference numeral 30 in FIG. 1 generally identifies an imaging reader having a presentation area configured as a generally upright window 26 and a gun-shaped housing 28 supported by a base 32 for supporting the imaging reader 30 on a countertop. The imaging reader 30 can thus be used in a hands-free mode as a stationary workstation in which products are slid, swiped past, or presented to, the window 26, or can be picked up off the countertop and held in an operator's hand and used in a handheld mode in which the reader is moved, and a trigger 34 is manually depressed to initiate imaging of a target, especially one- or two-dimensional symbols, to be read at a distance from the window 26. In another variation, the base 32 can be omitted, and housings of other configurations can be employed. A cable, as illustrated in FIG. 1, connected to the base 32 can also be omitted, in which case, the reader 30 communicates with a remote host by a wireless link, and the reader is electrically powered by an on-board battery.

Figure 2:
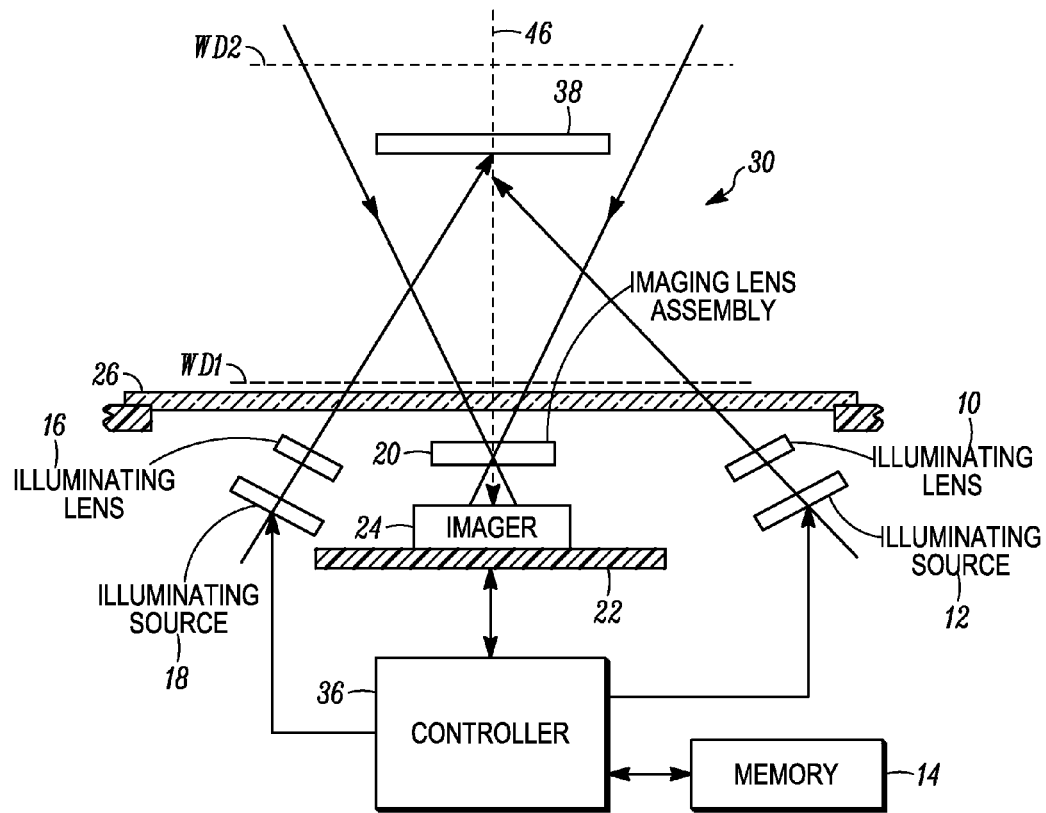
FIG. 2 is a schematic diagram of various components of the reader of FIG. 1.

As schematically shown in FIG. 2, an imager 24 is mounted on a printed circuit board 22 in the reader. The imager 24 is a solid-state device, for example, a CCD or a CMOS imager having an array of addressable image sensors or pixels, preferably arranged in a single, linear, one-dimensional row, and operative for detecting return light captured by an imaging lens assembly 20 along an optical path or optical axis 46 through the window 26. The return light is scattered and/or reflected from a target or symbol 38 as pixel data over a field of view. The imaging lens assembly 20 is operative for focusing and projecting the return light onto the array of image sensors to enable the symbol 38 to be read. The symbol 38 is located anywhere in a working range of distances between a close-in working distance (WD1) and a far-out working distance (WD2). In a preferred embodiment, WD1 is about four to six inches from the imager array 24, and WD2 can be many feet from the window 26, for example, around fifty feet away.

An illuminating assembly is also mounted in the imaging reader and preferably includes an illuminator or illuminating light sources 12, 18, e.g., light emitting diodes (LEDs), and corresponding illuminating lenses 10, 16 to uniformly illuminate the symbol 38 with an illuminating light having an intensity level over an illumination time period. The light sources 12, 18 are preferably pulsed.

As shown in FIG. 2, the imager 24 and the illuminating light sources 12, 18 are operatively connected to a controller or programmed microprocessor 36 operative for controlling the operation of these components. Preferably, the microprocessor 36 includes a decoder for processing the return light from the target symbols, and for decoding the captured target images. A memory 14 is accessible by the controller 36 for storing and retrieving data.

In operation, the controller 36 sends a command signal to pulse the illuminating light sources 12, 18 for the illumination time period, say 500 microseconds or less, and energizes and exposes the imager 24 to collect light, e.g., illumination light and/or ambient light, from the symbol during an exposure time period. A typical array needs about 16-33 milliseconds to acquire the entire target image and operates at a frame rate of about 30-60 frames per second.

Figure 3:
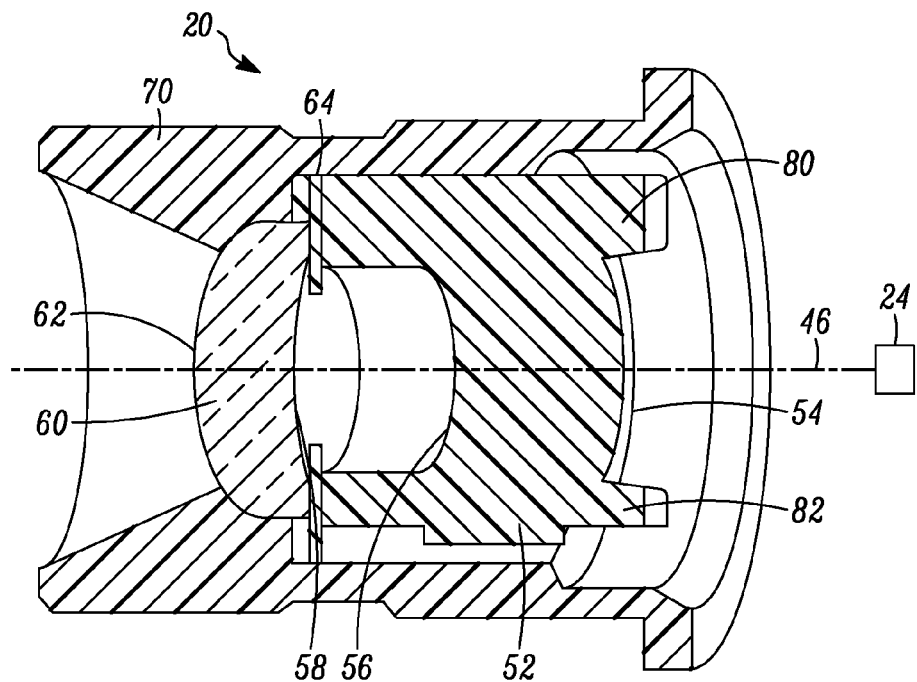
FIG. 3 is a part-sectional, part-isometric, cross-sectional view of a hybrid imaging lens assembly in accordance with this invention for use in the reader of FIG. 1.
Figure 5:
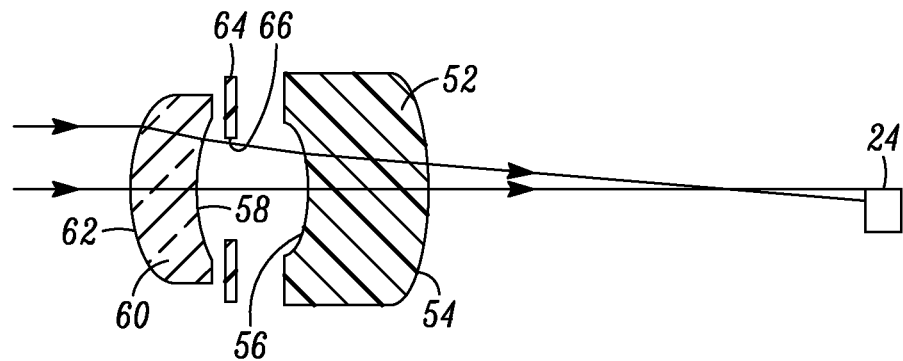
FIG. 5 is an exploded, diagrammatic side elevational view of the optical components of the hybrid imaging lens assembly of FIG. 3 depicting ray traces.
Figure 6:
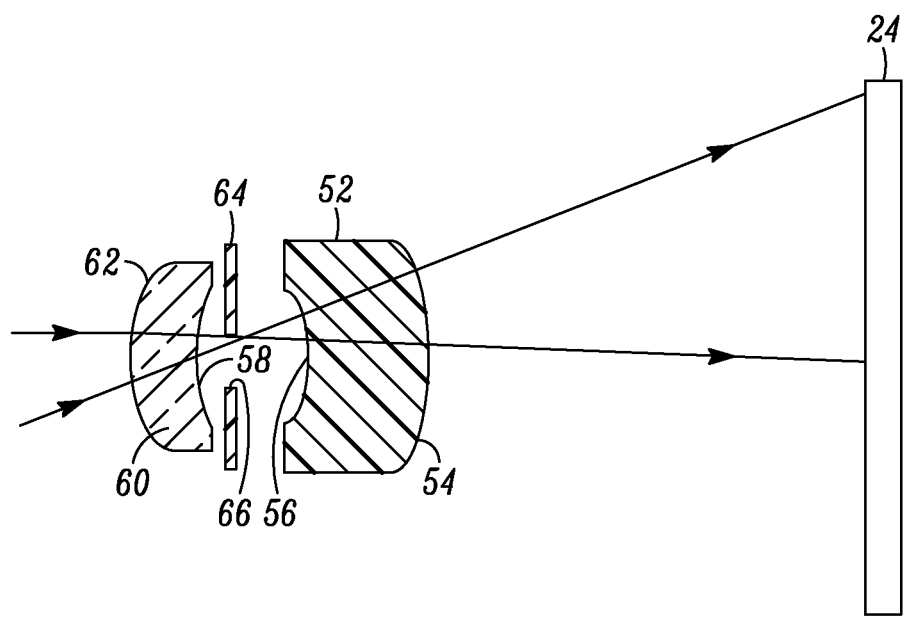
FIG. 6 is an exploded, diagrammatic top plan view of the optical components of the hybrid imaging lens assembly of FIG. 3 depicting ray traces.
Figure 7:
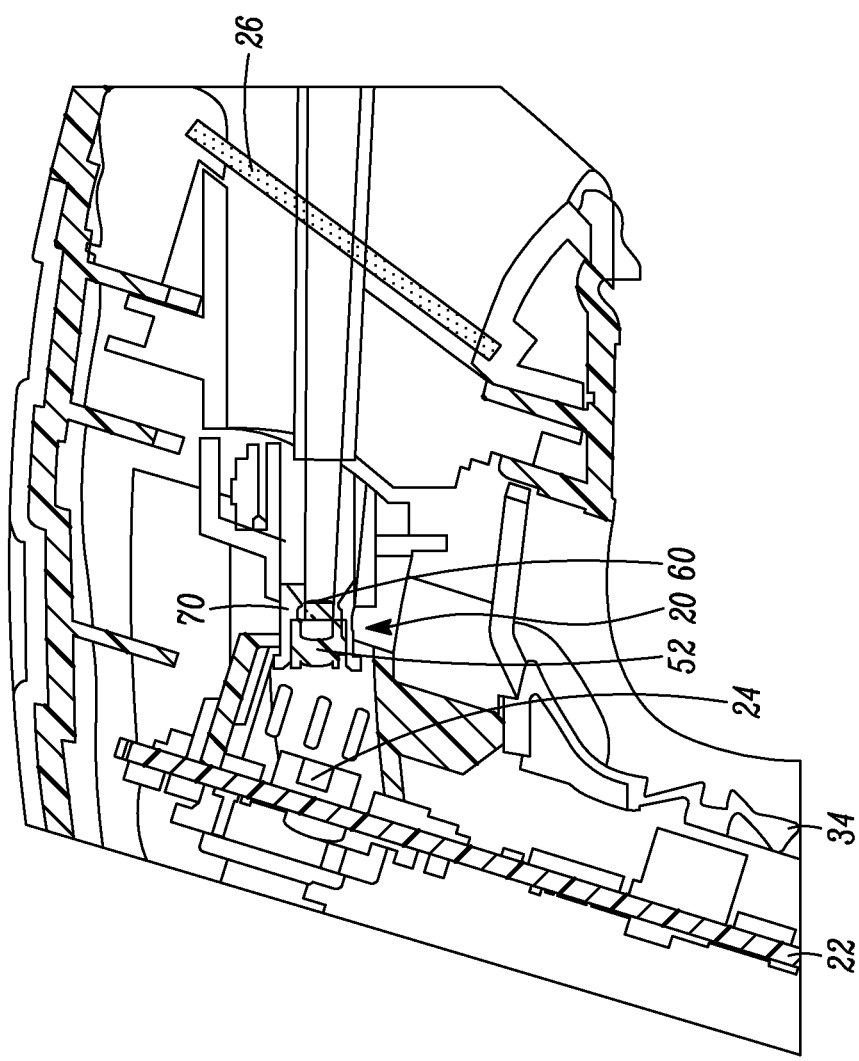
FIG. 7 is a broken-away view depicting the hybrid imaging lens assembly in alignment with an imager in an imaging reader in accordance with this invention.

In accordance with one aspect of this invention, as shown in FIGS. 3 and 7, the imaging lens assembly 20 provided in the reader 30 is modified to be a compact hybrid lens assembly operative for capturing return illumination light through the window 26 from the target 38 over the field of view, and for projecting the captured return illumination light onto the array 24 during electro-optical reading of the target 38. The hybrid assembly 20 includes a plastic lens 52 for optical aberration correction. Preferably, the plastic lens 52 has opposite nearly concentric surfaces 54, 56 of substantially the same curvature (see FIGS. 5-6) and has substantially virtually none of the optical power of the imaging lens assembly 20. The aspheric profile of the plastic lens 52 redistributes incoming light rays (see FIGS. 5-6) for better wavefront matching and improved image quality. The hybrid assembly 20 also includes a glass lens 60 axially spaced away from the plastic lens 52 along the optical axis 46. The glass lens 60 has substantially virtually all of the optical power of the imaging lens assembly 20 for thermal stability. Preferably, the glass lens 60 has opposite surfaces 58, 62 (see FIGS. 5-6) of different curvature to bend the incoming light rays.

Figure 4:
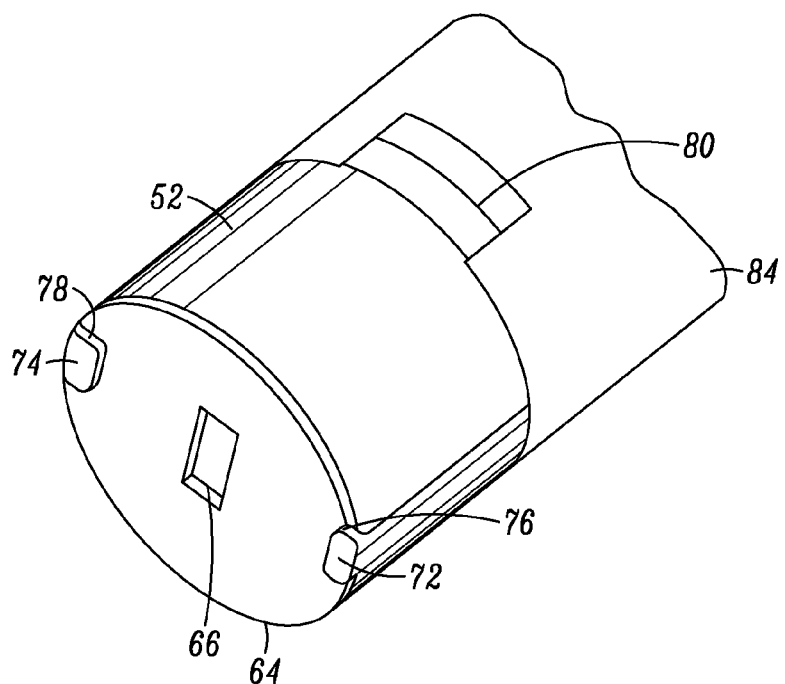
FIG. 4 is a perspective view of some of the components of the hybrid imaging lens assembly during alignment.

The hybrid assembly 20 further includes an aperture stop 64, as a discrete optical component, between the lenses 52, 60. The aperture stop 64 has opaque walls bounding an asymmetrical aperture 66 (see FIG. 4), e.g., a rectangular or elliptical aperture, through which the optical axis 46 extends. A tubular, generally cylindrical holder 70 holds the lenses 52, 60 and the aperture stop 64 in axially spaced fixed relation relative to the array 24. Alignment elements remote from the holder are operative to align the asymmetrical aperture 66 relative to the array 24. Specifically, the long dimension of the asymmetrical aperture 66 extends along a direction generally perpendicular to the elongation of the array 24. Put another way, as shown in the side views of FIGS. 3 and 5, the long dimension of the asymmetrical aperture 66 is oriented to be parallel to the shorter dimension of the array 24. As shown in FIG. 6, the shorter dimension of the asymmetrical aperture 66 is oriented to be parallel to the longer dimension of the array 24. Preferably, the alignment elements are integral with the plastic lens 52 by being molded therewith.

Thus, the alignment elements include a first pair of molded projections 72, 74 (see FIG. 4) that are received in a pair of cutouts 76, 78 formed in the aperture stop 64 to align the aperture stop 64 with the plastic lens 52. The cutouts 76, 78 straddle the aperture 66. The alignment elements further include a second pair of molded extensions 80, 82 for engagement with a turning or alignment tool 84 (see FIG. 4) to turn and angularly align the plastic lens 52 with the linear array 24. The lenses 52, 60 and the aperture stop 64 are all fixed in place, preferably with an adhesive bond, within the holder 70. When the turning tool 84 engages the plastic lens 52, the entire held assembly turns as a unit until proper angular alignment around the optical axis 46 is secured with the array 24. FIG. 7 depicts the aligned assembly 20 relative to the array 24 in a reader. The cutouts 76, 78 could equally well be formed in the plastic lens 52, in which case, the projections 72, 74 would be formed on the aperture stop 64. Similarly, the extensions 80, 82 need not be formed on the plastic lens 52, but could be formed on the tool 84.

Thus, the hybrid assembly 20 is part-glass and part-plastic. Since virtually all the optical power is configured in the glass lens 60, and virtually no optical power is configured in the plastic lens 52, the hybrid assembly 20 has better thermal stability and better resistance to focal shift with temperature variation as compared to an all-plastic lens assembly. The use of plastic lowers the size, weight and cost of the overall assembly and also lowers the number of optical components that comprise the assembly.

The use of plastic further enables alignment elements 72, 74, 80, 82 to be molded into the plastic lens 52. This could not be done with a glass lens. As noted above, these alignment elements enable the aperture stop 64 to be aligned with the plastic lens 52, and also enable the plastic lens 52, as well as the entire assembly 20, to be aligned with the linear array 24. Thus, the asymmetrical aperture 66 can be readily incorporated into the assembly 20. The aperture stop 64 need no longer be molded into the holder 70, but instead, can be made as a quite thin separate component, and with a sharply defined edged aperture 66, to thereby realize improved optical performance.

In the hybrid assembly of this invention, the aperture 66 is placed between the glass lens 60 and the plastic lens 52, and provides optimum compensation of odd order aberrations (coma, astigmatism, distortion, etc.) since they tend to cancel each other. As a result, image distortion of less than 0.5% can be easily achieved. Image magnification stays nearly unchanged on and off the optical axis 46. Another benefit is that the physical size or diameter of the lenses 52, 60 can be minimized, thereby further reducing the overall weight and volume of the assembly 20.

It will be understood that each of the elements described above, or two or more together, also may find a useful application in other types of constructions differing from the types described above.

While the invention has been illustrated and described as a compact hybrid imaging lens assembly in an imaging reader, it is not intended to be limited to the details shown, since various modifications and structural changes may be made without departing in any way from the spirit of the present invention. For example, this invention is not to be limited solely to imaging readers whose only function is to image bar code symbols, but could equally apply to mobile computers or terminals having an imager as one of its subsystems.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A compact hybrid imaging lens assembly for capturing return light from a target over a field of view of an array of image sensors of a solid-state imager, and for projecting the captured return light onto the array during electro-optical reading of the target, the assembly comprising:
   a plastic lens for optical aberration correction;
   a glass lens spaced away from the plastic lens along an optical axis, the glass lens having substantially all optical power of the imaging lens assembly for thermal stability;
   an aperture stop between the lenses and having opaque walls bounding an asymmetrical aperture through which the optical axis extends;

a holder for holding the lenses and the aperture stop in spaced relation relative to the array; and alignment elements remote from the holder for aligning the asymmetrical aperture relative to the array, wherein the alignment elements include a plurality of projections and a plurality of cutouts, each projection being received in a respective cutout; and wherein one of the aperture stop and the plastic lens has the cutouts, and wherein the other of the aperture stop and the plastic lens has the projections that are received in the cutouts to align the aperture stop with the plastic lens.

2. The assembly of claim 1, wherein the plastic lens has substantially none of the optical power of the imaging lens assembly and has opposite surfaces of substantially the same curvature.

3. The assembly of claim 1, wherein the glass lens has opposite surfaces of different curvature.

4. The assembly of claim 1, wherein the aperture stop is a discrete optical component separate from the holder.

5. The assembly of claim 1, wherein the array is a linear array, and wherein one of the plastic lens and an alignment tool has the cutouts, and wherein the other of the plastic lens and the alignment tool has the projections that are received in the cutouts to align the plastic lens with the linear array.

6. A reader for electro-optically reading a target, comprising:

a housing having a presentation area;

a solid-state imager in the housing and including an array of image sensors having a field of view; and a compact hybrid imaging lens assembly in the housing, for capturing return light over the field of view from the target through the presentation area, and for projecting the captured return light onto the array during electro-optical reading of the target, the assembly including a plastic lens for optical aberration correction, a glass lens spaced away from the plastic lens along an optical axis, the glass lens having substantially all optical power of the imaging lens assembly for thermal stability, an aperture stop between the lenses and having opaque walls bounding an asymmetrical aperture through which the optical axis extends, a holder for holding the lenses and the aperture stop in spaced relation relative to the array, and alignment elements remote from the holder for aligning the asymmetrical aperture relative to the array;

wherein the alignment elements include a plurality of projections and a plurality of cutouts, each projection being received in a respective cutout; and wherein one of the aperture stop and the plastic lens has the cutouts, and wherein the other of the aperture stop and the plastic lens has the projections that are received in the cutouts to align the aperture stop with the plastic lens.

7. The reader of claim 6, wherein the plastic lens has substantially none of the optical power of the imaging lens assembly and has opposite surfaces of substantially the same curvature.

8. The reader of claim 6, wherein the glass lens has opposite surfaces of different curvature.

9. The reader of claim 6, wherein the aperture stop is a discrete optical component separate from the holder.

10. The reader of claim 6, wherein the array is a linear array, and wherein one of the plastic lens and an alignment tool has the cutouts, and wherein the other of the plastic lens and the alignment tool has the projections that are received in the cutouts to align the plastic lens with the linear array.

11. A method of capturing return light from a target over a field of view of an array of image sensors of a solid-state imager, and of projecting the captured return light onto the array during electro-optical reading of the target, the method comprising the steps of:

correcting optical aberration with a plastic lens;

spacing a glass lens with substantial optical power for thermal stability away from the plastic lens along an optical axis;

positioning an aperture stop having opaque walls bounding an asymmetrical aperture through which the optical axis extends between the lenses;

holding the lenses and the aperture stop in a holder in a spaced relation relative to the array;

aligning the asymmetrical aperture relative to the array with alignment elements remote from the holder;

forming a pair of cutouts in the aperture stop, and molding a pair of projections integral with the plastic lens; and wherein the aligning step is performed by receiving the projections in the cutouts to align the aperture stop with the plastic lens.

12. The method of claim 11, and configuring the plastic lens with substantially no optical power and with opposite surfaces of substantially the same curvature.

13. The method of claim 11, and configuring the glass lens with opposite surfaces of different curvature.

14. The method of claim 11, and configuring the aperture stop as a discrete optical component separate from the holder.

15. The method of claim 11, and the steps of configuring the array as a linear array, and molding a pair of extensions integral with the plastic lens; and wherein the aligning step is performed by engaging and angularly turning the extensions about the optical axis to align the plastic lens with the linear array.

* * * * *